United States Patent
Gihm et al.

(10) Patent No.: US 11,408,097 B2
(45) Date of Patent: Aug. 9, 2022

(54) PROCESS FOR PREPARING A YARN COMPRISING CARBON NANOTUBES AND YARN PREPARED THEREBY

(71) Applicant: AweXome Ray, Inc., Anyang-si (KR)

(72) Inventors: Se Hoon Gihm, Seongnam-si (KR); Keun Soo Jeong, Seoul (KR); Yeon Su Jung, Seoul (KR)

(73) Assignee: AweXome Ray, Inc., Anyang-si (KR)

( * ) Notice: Subject to any disclaimer, the term of this patent is extended or adjusted under 35 U.S.C. 154(b) by 157 days.

(21) Appl. No.: 16/572,902

(22) Filed: Sep. 17, 2019

(65) Prior Publication Data
US 2020/0109492 A1 Apr. 9, 2020

(30) Foreign Application Priority Data
Oct. 4, 2018 (KR) .................. 10-2018-0118535

(51) Int. Cl.
*D01F 9/127* (2006.01)
*D02G 3/16* (2006.01)
(Continued)

(52) U.S. Cl.
CPC .............. *D01F 9/127* (2013.01); *D02G 3/16* (2013.01); *B82Y 30/00* (2013.01); *B82Y 40/00* (2013.01); *D10B 2101/122* (2013.01)

(58) Field of Classification Search
CPC ............ D01F 9/127; D01F 9/133; D01F 9/12; D02G 3/16; B82Y 30/00; B82Y 40/00; D10B 2101/122; D01D 5/084; C01B 32/158; C01B 32/159; C01B 32/16; C01B 32/162; C01B 32/164; C01B 32/166; C01B 32/168; C01B 32/17; C01B 32/172;
(Continued)

(56) References Cited

U.S. PATENT DOCUMENTS 7,323,157 B2 * 1/2008 Kinloch .............. C04B 35/6229
423/447.3
7,550,907 B2 6/2009 Jiang et al.
(Continued)

FOREIGN PATENT DOCUMENTS

CN 101556247 A 10/2009
CN 101665247 A 3/2010
(Continued)

OTHER PUBLICATIONS

Li, et al., Direct Spinning of Carbon Nanotube Fibers from Chemical Vapor Deposition Synthesis, Science 2004; 304: 276-278 (Year: 2004).*
(Continued)

*Primary Examiner* — Daniel C. McCracken
(74) *Attorney, Agent, or Firm* — Young Basile Hanlon & MacFarlane, P.C.

(57) ABSTRACT

The present invention provides a process for preparing a yarn, which comprises introducing a raw material that comprises a carbon source and a catalyst into a reaction chamber having a heating means, converting the carbon source into a plurality of carbon nanotubes in a heating part of the reaction chamber with thermal energy supplied by the heating means, and growing the plurality of carbon nanotubes in the vertical direction to form a yarn by the interactions among the carbon nanotubes.

20 Claims, 5 Drawing Sheets

(51) Int. Cl.
*B82Y 30/00* (2011.01)
*B82Y 40/00* (2011.01)

(58) Field of Classification Search
CPC ... C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36
See application file for complete search history.

(56) References Cited

U.S. PATENT DOCUMENTS

| | | | |
|---|---|---|---|
| 2003/0002627 | A1 | 1/2003 | Espinosa et al. |
| 2005/0006801 | A1* | 1/2005 | Kinloch ............ C04B 35/62272 264/5 |
| 2007/0003472 | A1 | 1/2007 | Toit |
| 2009/0208742 | A1 | 8/2009 | Zhu et al. |
| 2010/0260931 | A1 | 10/2010 | Malecki et al. |
| 2013/0309473 | A1* | 11/2013 | Sundaram ............ B82Y 40/00 428/220 |
| 2017/0011880 | A1 | 1/2017 | Hu |
| 2017/0292208 | A1 | 10/2017 | Yoon et al. |
| 2020/0243295 | A1 | 7/2020 | Gihm et al. |

FOREIGN PATENT DOCUMENTS

| | | |
|---|---|---|
| CN | 207330368 U | 5/2018 |
| EP | 3315644 A1 | 5/2018 |
| JP | H05347142 A | 12/1993 |
| JP | 2002293629 A | 10/2002 |
| JP | 2007128892 A | 5/2007 |
| JP | 2007536434 A | 12/2007 |
| JP | 2011148689 A | 8/2011 |
| JP | 2012010583 A | 1/2012 |
| JP | 2014075336 A | 4/2014 |
| JP | 2015149299 A | 8/2015 |
| JP | 2016046145 A | 4/2016 |
| KP | 20120090383 | 10/2010 |
| KR | 20070041024 A | 4/2007 |
| KR | 101284226 B1 | 7/2013 |
| KR | 1020140147004 | 12/2014 |
| KR | 20160102743 A | 8/2016 |
| KR | 20160118637 A | 10/2016 |
| KR | 101718784 | 3/2017 |
| KR | 1020170041365 | 4/2017 |
| KR | 20170121266 | 11/2017 |
| KR | 1020180044114 | 5/2018 |
| KR | 101876076 B1 | 7/2018 |
| KR | 20180104642 A | 9/2018 |
| KR | 101962215 B1 | 3/2019 |
| KR | 101956153 B1 | 6/2019 |
| TW | 201441445 A | 11/2014 |
| TW | 201726988 A | 8/2017 |
| WO | 2018143602 A1 | 8/2018 |

OTHER PUBLICATIONS

Methane, accessed online at https://www.engineeringtoolbox.com/methane-d_1420.html on Jun. 25, 2021 (Year: 2021).*
Qiu, et al, Liquid Infiltration into Carbon Nanotube Fibers: Effect on Structure and Electrical Properties, ACS Nano 2013; 7(10): 8412-8422 with Suppelmental Information (Year: 2013).*
Endo, et al., Carbon Fibers and Carbon Nanotubes, accessed online at http://web.mit.edu/tinytech/Nanostructures/Spring2003/MDresselhaus/i789.pdf on Oct. 7, 2021 (Year: 2021).*
West, The Big Microscopic Difference Carbon Nanotubes Make, accessed online at https://www.rockwestcomposites.com/blog/the-big-microscopic-difference-carbon-nanotubes-make/ on Oct. 7, 2021 (Year: 2021).*
International Search Report in co-pending International Application PCT/KR2019/011752 dated Dec. 17, 2019.
Taiwan Office Action in co-pending matter TW10920164350 dated Feb. 25, 2020 (eight pages including English translation).
Taiwan Search Report for co-pending matter TW108124101 dated Feb. 17, 2020 (2 pages, including English translation).
Office Action for KR1020190039773 dated Jul. 1, 2019.
Office Action for KR1020190039773 dated Oct. 17, 2019.
Potentially related U.S. Appl. No. 16/666,844, filed Oct. 29, 2019.
Potentially related U.S. Appl. No. 16/666,852, filed Oct. 29, 2019.
Potentially related U.S. Appl. No. 16/666,834, filed Oct. 29, 2019.
Office Action in co-pending application TW108124144 dated May 11, 2020, 10 pages.
Search Report for Patent Application No. 108124144 (completion date of the search: Feb. 17, 2020); 2 pages.
Office Action for KR10-2018-0152222 dated Jan. 10, 2019.
Office Action for KR 1020190009430 dated Feb. 25, 2019.
JP2021-544078_Office Action dated May 31, 2022, with English translation (14 pages).
Extended European Search Report in co-pending Application No. EP 19 86 8703 dated Jun. 7, 2022 (21 pages).

* cited by examiner

PROCESS FOR PREPARING A YARN COMPRISING CARBON NANOTUBES AND YARN PREPARED THEREBY

CROSS-REFERENCE TO RELATED APPLICATION

This application is based on and claims priority under 35 U.S.C. § 119(a) to Korean Patent Application No. 10-2018-0118535, which was filed on Oct. 4, 2018, in the Korean Intellectual Property Office, the disclosure of which is incorporated herein in its entirety by reference.

FIELD

The present invention relates to a process for preparing a yarn comprising carbon nanotubes and a yarn prepared thereby.

BACKGROUND

Carbon nanotubes (CNTs), a kind of carbon isotopes, are substances with a diameter of several to several tens of nanometers and a length of several hundreds of micrometers to several millimeters. Since the publication thereon in the journal Nature in 1991 by Dr. Iijima, research has been carried out in various fields thanks to their excellent thermal, electrical, and physical properties and high aspect ratio.

Such inherent properties of carbon nanotubes are attributable to the sp2 bond of carbon. They are stronger than iron, lighter than aluminum, and have an electrical conductivity similar to that of metals. Carbon nanotubes, according to the number of walls of nanotubes, are classified into single-walled carbon nanotubes (SWNTs), double-walled carbon nanotubes (DWNTs), and multi-walled carbon nanotubes (MWNTs). They are also divided into zigzag, armchair, and chiral structures depending on the asymmetry/chirality.

The mechanical strength of carbon nanotubes themselves is excellent. In particular, the tensile strength exceeds 100 GPa. However, synthesized carbon nanotubes are limited in their applications since they are short staple fibers. In order to solve this problem, a process for preparing carbon nanotube yarns of long fibers by connecting short carbon nanotubes has been intensively studied in recent years.

As a process for preparing a fiber type yarn that comprises carbon nanotubes, a forest spinning method and a direct spinning method are known. In the forest spinning method, once a catalyst has been deposited on a substrate, a carbon nanotube forest is synthesized in the direction perpendicular to the substrate. When the carbon nanotubes positioned at the end of the substrate are pulled with tweezers or a tape, a carbon nanotube yarn is spun while the carbon nanotubes are drawn in a form connected by the Van der Walls attraction between them. However, this method has the disadvantage that the production rate cannot be increased since it is not a continuous process.

In the direct spinning method, a liquid or gaseous carbon source and a catalyst together with a carrier gas are injected into the inlet provided at the top of a high-temperature heating furnace vertically installed to synthesize carbon nanotubes in the heating furnace. The carbon nanotube yarn that has moved to the bottom of the heating furnace together with the carrier gas is wound inside or outside the heating furnace to obtain a yarn.

Variables that affect the strength of a carbon nanotube yarn may include the length and diameter of the carbon nanotubes, the bonding strength between them, and the like.

In addition, there is a method of improving the degree of alignment to enhance the strength of a carbon nanotube yarn.

The degree of alignment of a carbon nanotube yarn refers to the degree to which the carbon nanotubes that constitute the yarn are gathered side by side in a certain direction in the yarn. Since a yarn in which carbon nanotubes are well aligned has relatively strong interactions among the carbon nanotubes, it is excellent in strength. Incidentally, for example, when the yarn is used as an electrode of a field emission emitter, electrons emitted from each of the carbon nanotubes can be emitted in a certain direction, which is also highly desirable in terms of the usage of the yarn.

In order to increase the degree of alignment of a carbon nanotube yarn, there is a method of increasing the withdrawing rate at the step of withdrawing the carbon nanotube yarn. In this method, for example, a yarn is withdrawn at a high speed of 20 to 50 m/min or more. In such event, although the degree of alignment may be enhanced, it is difficult to continuously prepare a carbon nanotube yarn since the carbon nanotube yarn is prone to breakage as the withdrawing rate becomes higher.

In order to increase the degree of alignment of a carbon nanotube yarn, there is considered another method of inducing the alignment of carbon nanotubes in the yarn by such means as ultrasonic waves in the step of withdrawing the yarn. However, the above methods have a definite limit to aligning carbon nanotubes in a certain direction since they utilize a post-treatment step in which carbon nanotubes have already been gathered.

An object of the present invention is to provide a process for preparing a yarn comprising carbon nanotubes and a yarn prepared thereby.

According to one aspect of the present invention, specific process conditions such as the feed rate of a raw material, the length of a heating part for heating the raw material, and the heating temperature are disclosed as the essential factors for the implementation of a yarn of the desired embodiment.

In particular, when the value of the specific parameter M described below in connection with the above factors falls within the scope according to the invention, the yarn produced according to the process of the present invention may have a polarized Raman ratio of 5 to 10. Within this range, the carbon nanotubes that constitute the yarn may be aligned to a desired level.

In addition, when the value of the parameter M falls within the range according to the present invention, the π-π interactions among the carbon nanotubes in the yarn can be maximized, which may play a significant role in the enhancement of the strength of the yarn.

Accordingly, the present invention has a practical purpose in providing a specific embodiment for its implementation.

SUMMARY

The present invention focuses on that a yarn with the desired characteristics, which comprises carbon nanotubes, can be prepared by controlling such factors as the feed rate of a raw material, the length of a heating part for heating the raw material, and the heating temperature. Thus, the following parameter M is established for the relationship between the factors:

$$M = T \cdot L \cdot F$$

in the above equation, T is the operating temperature (° C.) of the heating means, L is the length of the heating part (m), and F is the feed rate of the raw material (mg/sec).

Specifically, when the parameter M is controlled to fall in the range of 150° C.·m·mg/sec to 1,800° C.·m·mg/sec, it is possible to prepare a yarn that is excellent in strength by virtue of excellent interactions among the carbon nanotubes that are well aligned.

Accordingly, the present invention provides a process for preparing a yarn that comprises carbon nanotubes and a yarn prepared by the process for preparing a yarn. Hereinafter, the present invention will be described in detail through the embodiments.

Before the present invention is specifically described, the terms and words used in the present specification and claims should not be construed as limited to ordinary or dictionary terms. They must be construed in accordance with the technical idea of the present invention based on the principle that an inventor is allowed to appropriately define the concept of terms in order to explain its own invention in the best way.

Accordingly, it is to be understood that the constitution of the embodiments described in the present specification is merely the most preferred embodiment of the present invention and does not represent all the technical ideas of the present invention; thus, various equivalents and changes for substituting them at the time of filing the present application can be made.

As used herein, a singular expression covers a plural expression unless the context clearly dictates otherwise. In this specification, it is to be understood that the terms "comprise," "provide," "have," and the like indicate the presence of features, numbers, steps, elements, or combinations thereof performed; and that they do not exclude the presence of the possibilities of addition of one or more of other features, numbers, steps, elements, or combinations thereof.

As used herein, the term "introduction" may be described interchangeably with "feed" and "injection," and it may be understood to mean the input or addition of a liquid, a gas, heat, or the like.

As used herein, the term "yarn" refers to any yarn formed by the growth of carbon nanotubes in a fiber form or by gathering, aggregation, and/or fusion of a plurality of carbon nanotubes in a fiber form.

In one embodiment, the process for preparing a yarn according to the present invention comprises:

introducing a raw material that comprises a carbon source and a catalyst into a reaction chamber having a heating means;

converting the carbon source into a plurality of carbon nanotubes in a heating part of the reaction chamber with thermal energy supplied by the heating means; and growing the carbon nanotubes in the vertical direction to form a yarn by the interactions among the carbon nanotubes, wherein the following parameter M may be controlled so as to be maintained at 150° C.·m·mg/sec to 1,800° C.·m·mg/sec:

$$M = T \cdot L \cdot F$$

in the above equation, T is the operating temperature (° C.) of the heating means, L is the length of the heating part (m), and F is the feed rate of the raw material (mg/sec).

Generally, the raw material flows from the top to the bottom of the reaction chamber by the effect of gravity, causing a carbon rearrangement in which the carbon source is carbonized and/or graphitized on the catalyst that flows. Then, the carbon source is converted into short carbon nanotubes, and the carbon nanotubes just formed on the catalyst grow in the vertical direction as the carbon source is continuously supplied.

In summary, the step of converting into carbon nanotubes is a step in which the carbon source is graphitized and/or carbonized on the catalyst for a carbon rearrangement, and the carbon nanotubes grow in the vertical direction on the catalyst.

The carbon nanotubes that are growing can be gathered with one another by the interactions with other carbon nanotubes, and a plurality of carbon nanotubes can be gathered to finally form a yarn.

The conversion rate from the carbon source to the carbon nanotubes may be proportional to the operating temperature of the heating means. However, a rapid conversion rate to carbon nanotubes is not proportional to the degree of alignment of the carbon nanotubes in a yarn.

For example, rapid conversion to carbon nanotubes at relatively high temperatures may increase the formation frequency of branched carbon nanotubes that grow in the form spun in random directions other than the gravitational direction. This may lower the degree of alignment of the carbon nanotubes in the yarn thus prepared.

In addition, the carbon nanotubes that are growing on the catalysts randomly dispersed are gathered by the interactions with one another to form a yarn. Under the rapid conversion, it is difficult for the carbon nanotubes to be gathered in a certain direction. It is also possible that the degree of alignment in the yarn may be poor since they are gathered before they are aligned in a certain direction. For reference, that carbon nanotubes are gathered in a certain direction, that is, aligned, may mean a state in which the carbon nanotubes at mutually spaced positions are growing in the vertical direction while they are arranged substantially in parallel.

On the other hand, slow conversion to carbon nanotubes at relatively low temperatures may facilitate the alignment of carbon nanotubes that are growing, but it may cause a deterioration in the crystallinity and strength of the carbon nanotubes. This may also lead to an increase in the catalysts that do not participate in the reaction in the reaction chamber, causing the catalysts that do not participate in the reaction to be contained in the yarn together with the carbon nanotubes, thereby interfering with the interactions among the carbon nanotubes.

Thus, variably controlling the operating temperature of the heating means within a desired range may be required to prepare a yarn of the desired quality.

In another aspect, carbon nanotubes are produced and grown while the catalyst and the carbon source flow from the top to the bottom of the reaction chamber in the heating range (or heating part). As the heating part is long, the conversion from the carbon source to the carbon nanotubes can be sufficiently performed, which is advantageous to an increased in the crystallinity.

In such event, the time for the carbon nanotubes to grow is relatively long, so that the carbon nanotubes that are growing during this time can be readily aligned with respect to one another while they extend to a relatively long length.

Nevertheless, it is not desirable to unconditionally lengthen the duration of the heating part. This is because the formation frequency of branched carbon nanotubes that grow in the form spun in random directions other than the gravitational direction can also be significantly increased.

Hence, it may be necessary to select and control the operating temperature of the heating means and the length of the heating part within preferable ranges in order to secure appropriate conversion into carbon nanotubes and to prepare a well-aligned yarn accordingly. Here, it should be noted that the process conditions of these two may act complementarily with each other.

For example, even if the operating temperature of the heating means is relatively low, the conversion into carbon nanotubes and the growth and alignment thereof can be induced to a desired level while the unreacted catalyst is minimized if the length of the heating part is long.

Thus, the present invention focuses on the correlation between the two conditions. In detail, the product of the operating temperature (T) of the heating means and the length (L) of the heating part is established and introduced into the parameter M.

The present invention further introduces the feed rate of a raw material to the parameter M.

The faster the feed rate, the faster the supply of a carbon source, which can secure a fast growth of carbon nanotubes. But it is not desirable to unconditionally increase the feed rate.

For example, when a raw material is fed at a relatively fast feed rate at a certain operating temperature and at a certain heating part length, the conversion into carbon nanotubes and the growth thereof under the conditions described above can proceed relatively slowly as compared with the rapid supply of a raw material. In such event, the crystallinity and strength of the carbon nanotubes may be deteriorated, and a plurality of foreign substances such as amorphous carbon may be generated.

On the other hand, when a raw material is fed at a relatively slow feed rate at a certain operating temperature and at a certain heating part length, the conversion into carbon nanotubes and the growth thereof may not reach a desired level, thereby impairing the process efficiency. In addition, as the conversion rate of the raw material to carbon nanotubes is faster than the feed rate thereof, the raw material is locally depleted in the reaction chamber, which acts as an obstacle to the continuous production of the carbon nanotubes and may lower the crystallinity and strength.

Thus, the parameter M is established in the present invention for the relationship between the operating temperature (T) of the heating means, the length (L) of the heating part, and the feed rate (F) required for proper conversion into carbon nanotubes.

This parameter M reflects the fact that the operating temperature, the length of the heating part, and the feed rate are interrelated, rather than they are utilized as independent process control means, respectively. It is of significance that the parameter M helps quantitatively predict such qualitative characteristics as the quality of the resulting yarn, for example, the strength of the yarn and the degree of alignment of the carbon nanotubes that constitute the yarn.

In one example of the above, in the case where the length of the heating part is an invariable factor, the value according to the parameter M can satisfy the range of the present invention by controlling the operating temperature and the feed rate. On the other hand, in the case where the feed rate is an invariable factor, the value according to the parameter M can satisfy the range of the present invention by controlling the operating temperature and the length of the heating part. As described above, if the values of the parameter M in the former and the latter are substantially the same, despite the different conditions, the strength of the yarn thus obtained, the degree of alignment of the carbon nanotubes that constitute the yarn, and the like may be substantially similar, which is the major advantage of the present invention on the quantitative prediction as described above.

In one specific example, the value of the parameter M may be controlled to fall within the range of 150° C.·m·mg/sec to 1,800° C.·m·mg/sec, specifically 160° C.·m·mg/sec to 1,400° C.·m·mg/sec, more specifically 200° C.·m·mg/sec to 1,200° C.·m·mg/sec. When it is controlled to fall within this range, the carbon nanotubes may be converted into a state having desired crystallinity and strength and can be gathered in a well-aligned state. As a result, the quality of the yarn thus obtained may be excellent.

Particularly noteworthy is that the value of the parameter M is controlled to fall within a predetermined range in the preparation process of the present invention, not after the yarn is prepared, but during the steps until the yarn is prepared—specifically, during the conversion to carbon nanotubes and the growth thereof—, so that the carbon nanotubes are well aligned in the yarn finally obtained and the strength thereof is also excellent.

Typically, a predetermined tension is applied to a yarn finally prepared by adjusting the winding speed in the winding step, thereby inducing carbon nanotubes to align in the longitudinal direction of the yarn. In this conventional method, however, it is difficult to align, in a certain direction, the carbon nanotubes that have been already gathered and formed a part of the yarn.

Meanwhile, if the value of the parameter M is controlled to fall within the above range, the yarn finally obtained may have a predetermined polarized Raman ratio.

The polarized Raman ratio is a measure for evaluating the degree of alignment of carbon nanotubes that constitute a yarn. The degree of alignment of carbon nanotubes may be proportional to the polarization Raman ratio. For typical yarns, the polarized Raman ratio is at a level of 1 to 4.

The polarized Raman ratio may be expressed as the ratio (IG∥/IG⊥) of the maximum intensity of G peaks in the longitudinal direction of a yarn and the vertical direction of the yarn in the range of 1,560 cm−1 to 1,600 cm−1 in a Raman spectrum analysis. The yarn prepared according to the present invention may have a polarized Raman ratio of 5 to 10, which is higher than those of typical yarns.

Another advantage of controlling the value of the parameter M to fall within the above range is that the breaking strength of the prepared yarn is very good. The yarn obtained according to the preparation process of the present invention may have a breaking strength of 13 cN or more, specifically 16 cN or more, more specifically 16 cN to 30 cN.

The preferable values of the operating temperature (T) of the heating means, the length (L) of the heating part, and the feed rate (F) of the raw material selected to have the value of the parameter M fall within the above range may be selected from the following ranges.

The operating temperature of the heating means may be in a range of 550° C. to 2,500° C., specifically 1,050° C. to 1,500° C., more specifically 1,200° C. to 1,300° C.

The length of the heating part may be 0.01 m to 10 m, specifically 0.1 m to 2 m, more specifically 0.15 m to 1.5 m.

The feed rate of the raw material may be 0.05 mg/sec to 10 mg/sec, specifically 0.1 mg/sec to 3 mg/sec, more specifically 0.1 mg/sec to 1.1 mg/sec.

Throughout the overall procedures of preparing a yarn according to the preparation process of the present invention, the desired values may be variably selected from the above ranges, or any one selected value may be invariable.

It may be considered to control, independently from the parameter M, the mass ratio of the catalyst to the carbon source (=catalyst mass/carbon source mass) in order to obtain a yarn that satisfies the object of the present invention.

In one example on the above, the mass ratio of the catalyst to the carbon source may be 0.01 to 0.2, specifically 0.02 to 0.08.

If the carbon source is excessive for the catalyst, whereby the above ratio falls outside the above range, the conversion into carbon nanotubes and the growth thereof may proceed very slowly. As a result, the crystallinity and strength of the carbon nanotubes are poor, whereby the quality of the yarn thus obtained may be deteriorated.

On the other hand, if the catalyst is excessive for the carbon source, the content of the catalyst in the produced carbon nanotubes is increased, which may interfere with the interactions among the carbon nanotubes that constitute the yarn.

The carbon source may be a liquid or gaseous carbon compound. As a non-limiting example, it may be at least one selected from the group consisting of methanol, ethanol, isopropyl alcohol, butanol, pentanol, cetyl alcohol, ethylene glycol, propylene glycol, glycerol, erythritol, xylitol, sorbitol, bolemitol, allyl alcohol, geraniol, propargyl alcohol, inositol, menthol, methane, hexane, ethylene, acetylene, methyl acetylene, and vinyl acetylene. The carbon source may specifically be acetylene and/or methane.

The catalyst may be a substance that is not included in the catalyst cycle, but changes to an active secondary catalyst (or produces an active catalyst) in the catalytic reaction system. After the catalyst forms a secondary catalyst, carbon nanotubes can be synthesized. The catalyst may comprise at least one metallocene. The metallocene may be, for example, a compound of iron, nickel, cobalt, platinum, ruthenium, molybdenum, or vanadium, or an oxide thereof. In one example of the catalyst, the metallocene may be ferrocene.

The raw material may further comprise 0.01 part by weight to 5 parts by weight of a catalyst activator per 100 parts by weight of the carbon source.

Typically, the conversion to carbon nanotubes proceeds while the catalyst is melted, the carbon source is diffused into the catalyst, and then the catalyst is precipitated. The catalyst activator acts as a promoter at the time of the conversion into carbon nanotubes to increase the carbon diffusion rate, so that carbon nanotubes can be synthesized within a short time.

As the catalyst activator, for example, thiophene ($C_4H_4S$) may be used. Thiophene reduces the melting point of the catalyst and removes the foreign amorphous carbon, thereby enabling the synthesis of high purity carbon nanotubes at a relatively low temperature. The content of the catalyst activator may also affect the structure of carbon nanotubes. For example, if 1 to 10 parts by weight, particularly 1 to 5 parts by weight, of thiophene is employed per 100 parts by weight of acetylene as a carbon compound, a multiwalled carbon nanotube fiber may be obtained. If thiophene is employed in an amount of 0.5 part by weight or less with respect to acetylene, a single-walled carbon nanotube fiber may be obtained. The catalyst and the catalyst activator may be liquid in a liquid carbon source and may be gas in a gas phase carbon source.

A carrier gas may be used in the preparation process of the present invention in addition to the raw material as described above. The carrier gas will be described in detail below by the following non-limiting examples.

In one specific example, a carrier gas may be introduced into the reaction chamber together with the raw material in the step of introducing the raw material.

The carrier gas flows downward from the top of the reaction chamber, helping smooth the flow of the carbon source and the catalyst into or inside the reaction chamber. It may help discharge various impurities remaining in the reaction chamber from the inside of the reaction chamber to the outside. In order to achieve this advantage, the carrier gas may be introduced at a feed rate of 1 mg/sec to 200 mg sec. If it falls outside the above range, it is not advantageous in that the flow of the carbon source and the catalyst may be too slow or too fast, thereby adversely affecting the growth of carbon nanotubes and that the concentration of impurities contained in the yarn may be increased.

The carrier gas may comprise an inert gas and/or a reducing gas. The inert gas may be, for example, argon gas (Ar), nitrogen gas (N2), or a mixture thereof; and the reducing gas may be, for example, hydrogen gas (H2), ammonia gas (NH3), or a mixture thereof.

In one specific example, the carrier gas comprises hydrogen gas and at least one of nitrogen gas and argon gas.

The hydrogen gas may be contained in an amount of greater than 0% by volume up to 90% by volume, more preferably from 1% by volume to 10% by volume, based on the total volume of the carrier gas.

In order for the carbon source to be carbonized, it must undergo a reduction process. The hydrogen gas may be used to carbonize the carbon source through a reduction reaction and remove materials other than carbon to improve the yield and production rate of carbon nanotubes.

However, if the amount of hydrogen gas in the carrier gas exceeds the above range, the carbon in the carbon source may be reduced by hydrogen, resulting in a poor yield of carbon nanotubes. In addition, the excess hydrogen gas hinders the hydrogen atoms in the carbon source from being reduced to hydrogen molecules, thereby inhibiting the conversion of the carbon source to carbon nanotubes.

In another aspect, the impurities reacted with the hydrogen gas and thus reduced generally flow together with the carrier gas and are removed from the reaction chamber. However, if the amount of hydrogen gas is less than the above range, the reaction for reducing other substances than carbon may be insufficient. Thus, the occurrence of other side reactions and the increase in the concentration of impurities would hinder the graphitization and/or carbonization from proceeding smoothly, thereby deteriorating the quality of carbon nanotubes.

Hereinafter, with reference to the drawings, a reaction chamber which can be used in the preparation process of the present invention and the procedures for obtaining a yarn with the reaction chamber will be described in detail.

FIG. 1 shows a reaction chamber according to one embodiment of the present invention.

The reaction chamber (100) may comprise an inlet (110) formed at the top of the reaction chamber (100) to introduce a raw material;

a heating part (120) extending downward from the inlet (110) and provided with a heating means (122) on the inner and/or outer side thereof, in which an operating temperature environment is made such that a carbon source is converted into a plurality of carbon nanotubes;

a gathering part (130) extending downward from the heating part (120), in which the plurality of carbon nanotubes is gathered to form a yarn by the π-π interaction; and an outlet (140) extending downward from the gathering part (130) and discharging the yarn in which the carbon nanotubes are gathered.

The inlet (110) formed in the reaction chamber (100) may be provided with an injection nozzle for injecting a carbon source and a catalyst and a dispersing plate for injecting a carrier gas and a catalyst activator, if necessary. In addition, the inlet (110) may be further provided with a raw material supply unit for supplying a raw material to the reaction chamber (100) and a gas tank for supplying a carrier gas or the like, if necessary.

The carrier gas fed from the inlet (110) may be supplied to the reaction chamber (100) at a linear velocity so as to form a laminar flow in the heating part (120), for which a dispersing plate may be used. The carrier gas may be fed into the reaction chamber (100) through the inlet (110) from a carrier gas supply unit having a gas tank and a flow control means.

The heating part (120) will be described. The heating part (120) is provided with a heating means (122). When a raw material is introduced into the heating part (120) through the inlet (110), a catalyst contained therein flows from the top to the bottom of the heating part (120), and a high-temperature environment is made by the heating means (122) in the heating part (120). A carbon source can be converted into carbon nanotubes on the catalyst by the supplied thermal energy. In addition, since the raw material is continuously supplied to the heating part (120), the converted carbon nanotubes grow in the vertical direction. This growth may be collectively referred to as the fusion of carbon nanotubes with one another or the generation of carbon nanotubes at the ends thereof.

In such event, the operation of the heating part (120) may be controlled such that the value of the parameter M falls within the above range. In this operating environment, the plurality of carbon nanotubes grows in the vertical direction on the catalysts dispersed in the heating part (120), and they may grow substantially parallel to each other.

The growing carbon nanotubes may be gathered into a yarn in the gathering part (130) in which a lower temperature than that of the heating part (120) is made. The gathering is mainly carried out by the π-π interactions among the carbon nanotubes. In some cases, a gathering nozzle having an inner diameter that narrows downward may be provided in the gathering part (130) to facilitate the gathering of carbon nanotubes.

The yarn may be discharged from the reaction chamber (100) through the outlet (140) located at the bottom of the gathering part (130) to obtain a final yarn.

The step of obtaining a yarn may comprise immersing the yarn discharged from the reaction chamber (100) in a solvent and winding the immersed yarn using a bobbin, a cylindrical roller, or a plate.

The step of immersing a yarn in a solvent may enhance the π-π interactions among carbon nanotubes through a solvent that is capable of interacting with the carbon nanotubes and has high volatility. As a non-limiting example, the solvent may be at least one selected from the group consisting of ethane, ethylene, ethanol, methane, methanol, propane, propene, propanol, acetone, xylene, carbon monoxide, chloroform, acetylene, ethyl acetic acid, diethyl ether, polyethylene glycol, ethyl formate, mesitylene(1,3,5-trimethylbenzene), tetrahydrofuran, dimethylformamide, carbon tetrachloride, naphthalene, anthracene, dichloromethane, ketone, ether, hexane, heptane, octane, pentane, pentene, hexene, benzene, carbon tetrachloride, and toluene.

The winding step is a step of winding a yarn by a winding means or the like that is rotating about an axis by a driving system such as a motor. A flat plate, a spindle, a reel, a drum, or a conveyor may be used in addition to a bobbin, a cylindrical roller, or a plate.

In one example, the axis-rotating winding means may be a bobbin having a diameter of 1 cm to 100 cm, specifically 20 cm to 40 cm.

The rotation speed of the bobbin is not particularly limited as long as the parameter M satisfies the range of the present invention and carbon nanotubes can be continuously produced. For example, it may be 100 rpm to 5,000 rpm, specifically 200 rpm to 1,000 rpm.

In some cases, the volatilization of the solvent may be induced using an IR lamp, a wind-driven dryer, or the like in order to accelerate the volatilization of the solvent before the yarn is wound.

Meanwhile, the preparation process of the present invention may further comprise applying a magnetic field to the inside and/or outside of at least one of the gathering part and the outlet in order for the lower ends of the plurality of carbon nanotubes that are being, and/or have been, converted to be vertically aligned.

The present invention focuses on that the feed rate of a raw material and the conversion speed to carbon nanotubes should be controlled to a desired ratio in order to prepare a yarn with the desired characteristics. Thus, the parameter M related to the operating temperature (T), the length (L) of the heating part, and the feed rate (F) of the raw material, which have a complementary relationship in the preparation process, is established.

It is described in detail hereinbefore that the operating temperature (T), the length (L) of the heating part, and the feed rate (F) of the raw material are controlled in order to have the value of the parameter M fall within a predetermined range, whereby it is possible to produce carbon nanotubes having excellent crystallinity and strength and that they can grow in a well-aligned state to form a yarn.

The significance of the parameter M established in the present invention lies in that carbon nanotubes can grow in a well-aligned state during the steps until the yarn is prepared—specifically, during the conversion to carbon nanotubes and the growth thereof—, so that the carbon nanotubes are well aligned in the yarn finally obtained and the strength thereof is also excellent. The present invention makes it possible to prepare a yarn in a state in which carbon nanotubes are well aligned, as compared with the conventional methods, for example, a process in which a predetermined tension is applied to a yarn finally prepared.

Hereinafter, the function and effect of the present invention will be described in more detail through specific examples of the present invention. However, these examples are merely illustrative of the invention and are not intended to limit the scope of the invention.

EXAMPLES

Example 1

A raw material containing ferrocene as a catalyst, methane as a carbon source, and thiophene as a catalyst activator was fed through the inlet of the reaction chamber at a feed rate (F) of about 0.5 mg/sec to 1 mg/sec. The raw material was fed at a ratio of thiophene:ferrocene:methane=1:1.46:26.3 on a weight basis. A carrier gas with a volume ratio of argon:hydrogen of 9:1 was fed at a rate of 10 mg/sec to 30 mg/sec with the raw material.

At that time, the operating temperature (T) of the heating means of the reaction chamber was controlled to about 1,200° C. to 1,300° C., the length of the heating part was 1.2 m, and the carrier gas was supplied at a rate of about 16 mg/sec.

The yarn discharged from the outlet at the bottom of the reaction chamber was immersed in a bath containing ethanol, and the solvent was dried well by winding the yarn with a winding means to obtain a yarn having a length of about 1 m.

Here, in the preparation of a yarn according to Example 1, the feed rate (F) and the operating temperature (T) were controlled such that the following parameter M was maintained at about 1,034° C.·m·mg/sec from the start to the end of the preparation:

$$M = T \cdot L \cdot F$$

Example 2

A yarn having a length of about 1 m was prepared according to the method of Example 1, except that the feed rate (F) and the operating temperature (T) were controlled such that the parameter M was maintained at about 235° C.·m·mg/sec from the start to the end of the preparation.

Comparative Example 1

A yarn having a length of about 1 m was prepared according to the method of Example 1, except that the feed rate (F) and the operating temperature (T) were controlled such that the parameter M was maintained at about 1,851° C. m·mg/sec from the start to the end of the preparation.

Comparative Example 2

A yarn having a length of about 1 m was prepared according to the method of Example 1, except that the feed rate (F) and the operating temperature (T) were controlled such that the parameter M was maintained at about 141° C.·m·mg/sec from the start to the end of the preparation.

Test Example 1: Evaluation of the Degree of Alignment of a Yarn

In order to evaluate the degree of alignment of carbon nanotubes, the polarized Raman ratio ($IG_{\parallel}/IG_{\perp}$) of the yarns prepared in the Examples and the Comparative Examples was measured, and the results are shown in Table 1 below.

Figure 1:
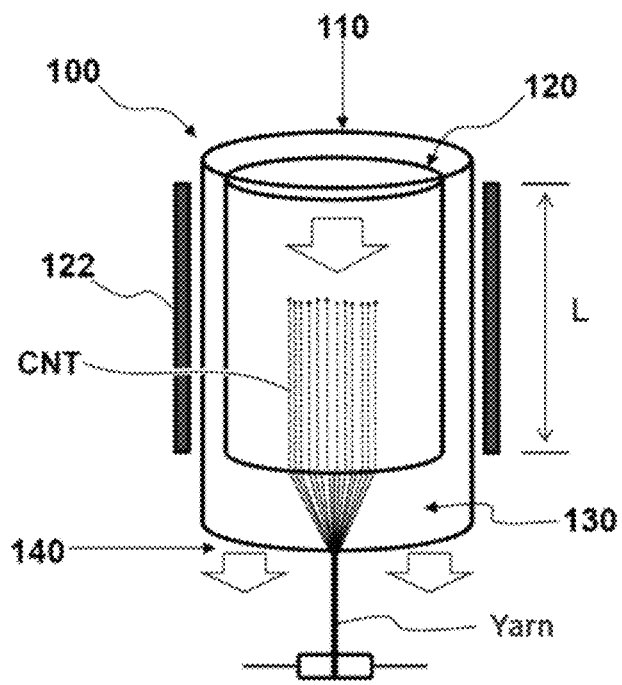
FIG. 1 is a schematic diagram of a reaction chamber for preparing yarns.
Figure 2:
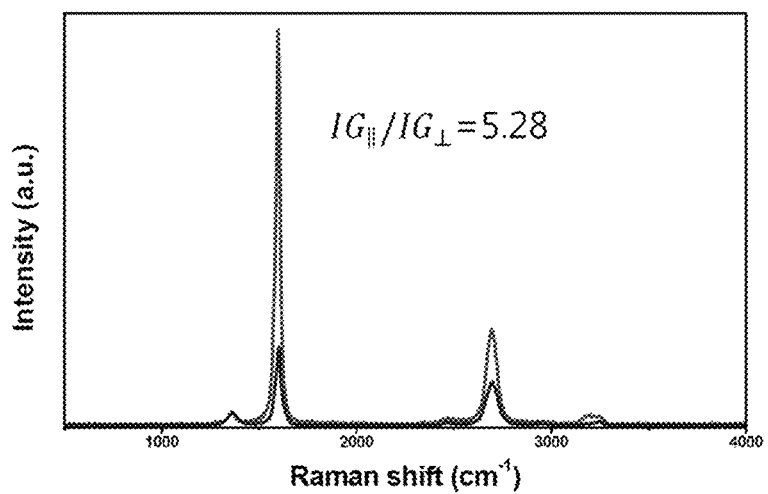
FIG. 2 is a graph showing polarized Raman spectra of Example 1.
Figure 3:
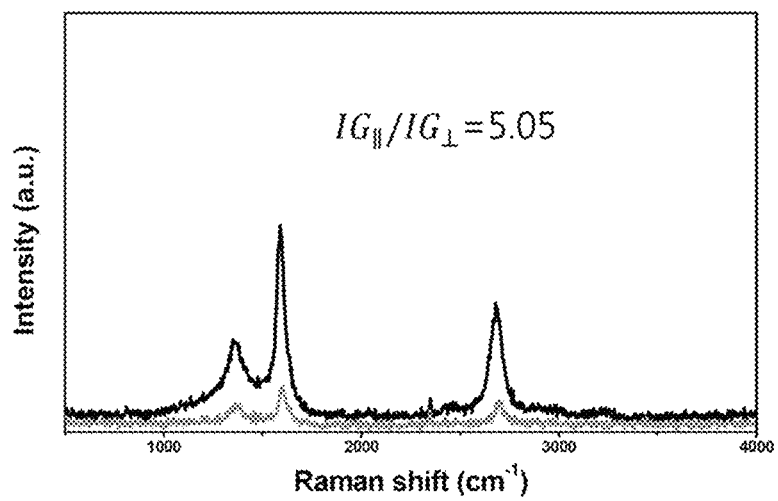
FIG. 3 is a graph showing polarized Raman spectra of Example 2.
Figure 6:
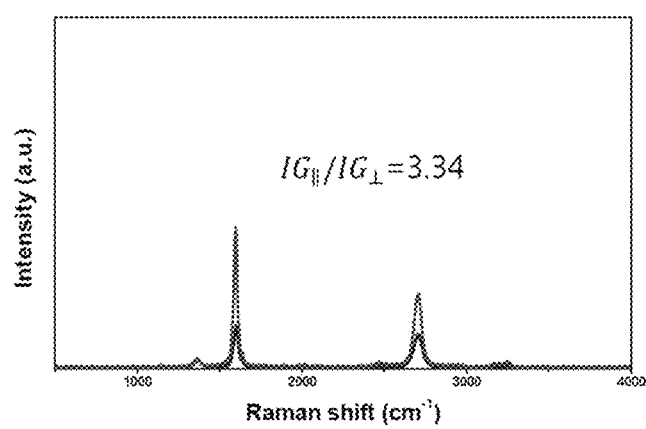
FIG. 6 is a graph showing polarized Raman spectra of Comparative Example 1.
Figure 7:
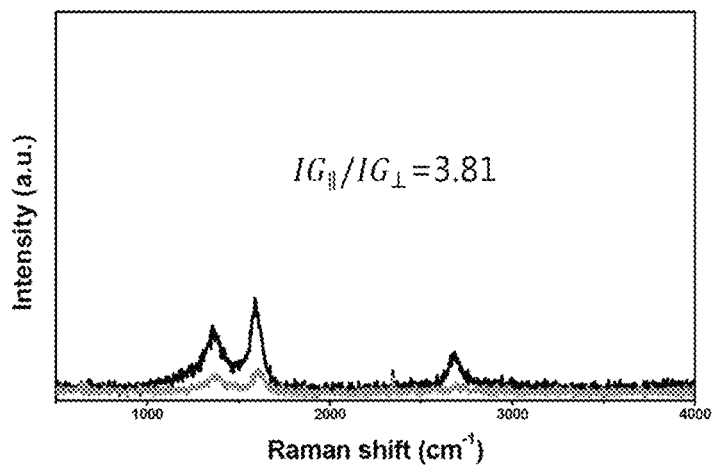
FIG. 7 is a graph showing polarized Raman spectra of Comparative Example 2.

The graphs of the polarized Raman ratios of Examples 1 and 2 are shown in FIGS. 2 and 3, respectively. The graphs of the polarized Raman ratios of Comparative Examples 1 and 2 are shown in FIGS. 6 and 7.

TABLE 1

| | Parameter M (° C. · m · mg/sec) | Polarized Raman ratio ($IG_{\parallel}/IG_{\perp}$) |
| --- | --- | --- |
| Example 1 | 1034 | 5.28 |
| Example 2 | 235 | 5.05 |
| Comparative Example 1 | 1851 | 3.34 |
| Comparative Example 2 | 141 | 3.81 |

As can be seen from Table 1 and FIGS. 2 and 3, Examples 1 and 2, in which the parameter M was controlled to fall within the scope of the present invention, showed a good polarization Raman ratio of 5 or more, respectively.

The polarized Raman ratio is conventionally proportional to the degree of alignment of carbon nanotubes that constitute a yarn. Thus, it can be deduced from these values that the yarns prepared according to the preparation process of the present invention have carbon nanotubes well aligned therein as compared with the Comparative Examples.

Figure 4:
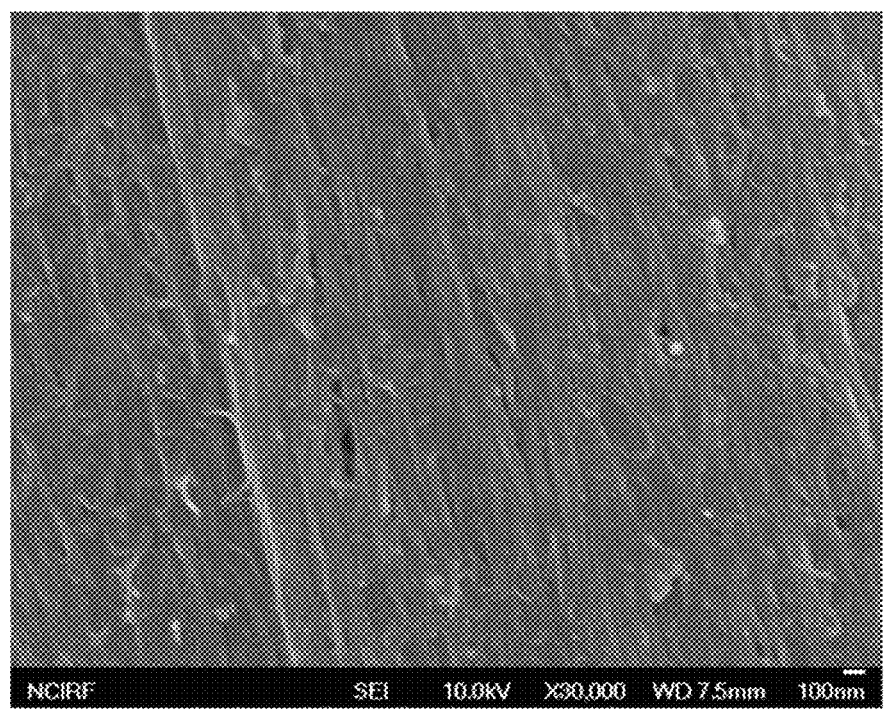
FIG. 4 is an SEM photograph of the surface of a yarn prepared according to Example 1.
Figure 5:
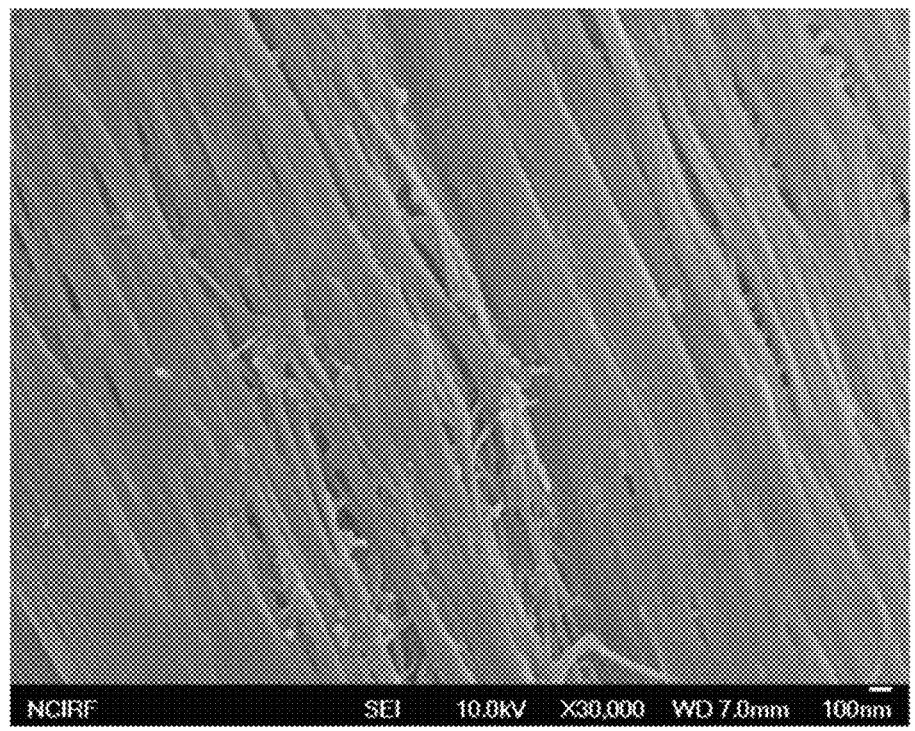
FIG. 5 is an SEM photograph of the surface of a yarn prepared according to Example 2.

In this regard, FIG. 4 shows an SEM photograph of a yarn produced according to Example 1, and FIG. 5 shows an SEM photograph of a yarn prepared according to Example 2.

Referring to these drawings, it can be confirmed that the surfaces of the yarns of Examples 1 and 2 are smoothly arranged and that there is no gap on the surface of the yarns. Thus, the carbon nanotubes are gathered at a high density. In addition, an undesirable feature such as a shape in which carbon nanotube fibers are entangled or a part of carbon nanotubes are branched is hardly observed. Thus, it is expected that the yarns of Examples 1 and 2 will have excellent strength.

In contrast, according to Table 1, Comparative Examples 1 and 2, in which the parameter M fell outside the scope of the present invention, show polarization Raman ratios significantly lower than those of the Examples. It can be inferred from these results that the alignment of carbon nanotubes is not at the desired level, unlike the Examples.

Figure 8:
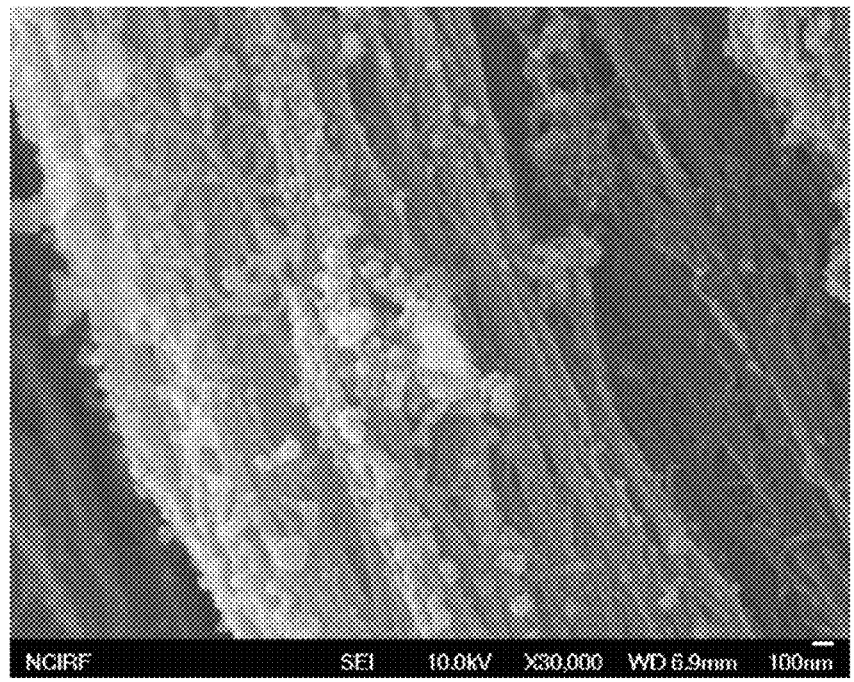
FIG. 8 is an SEM photograph of the surface of a yarn prepared according to Comparative Example 1.
Figure 9:
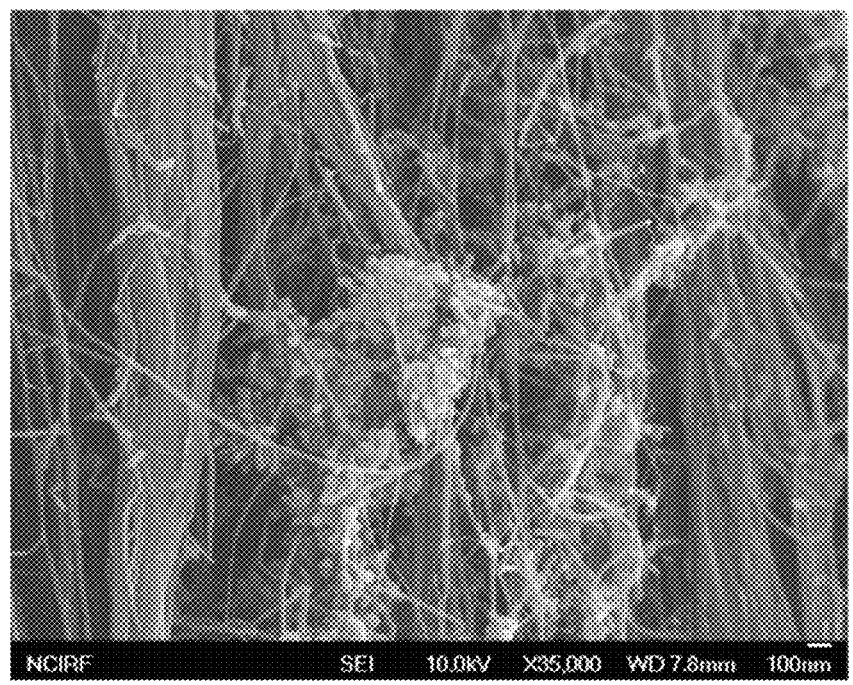
FIG. 9 is an SEM photograph of the surface of a yarn prepared according to Comparative Example 2.

In this regard, FIG. 8 shows an SEM photograph of a yarn produced according to Comparative Example 1, and FIG. 9 shows an SEM photograph of a yarn prepared according to Comparative Example 2.

Referring to these drawings, it can be confirmed that the surfaces of the yarns of Comparative Examples 1 and 2 are not smoothly arranged since the carbon nanotubes have a plurality of branches and that the carbon nanotubes are complicatedly entangled and contain a large amount of impurities. Particularly noteworthy is that the carbon nanotubes in Comparative Examples 1 and 2 are not gathered at a high density with some spaces between one another. Thus, it is expected that the yarns will have poor strength.

It is understood from the results of Test Example 1 that when the parameter M satisfies the range of the present invention, it is possible to prepare a yarn in an ideal state in which the carbon nanotubes are well aligned at a high density and have a good polarized Raman ratio.

Test Example 2: Evaluation of Strength

The breaking strength tests were carried out for the yarns prepared in the Examples and the Comparative Examples. The breaking strength tests were carried out using an FAVI- MAT+ equipment from Textechno. The load cell range was 210 cN. The gauge length was 2 cm, and the experiment was carried out at a speed of 2 mm/min. The results of the breaking strength measurement are shown in Table 2 below.

TABLE 2

| | Parameter M (° C. · m · mg/sec) | Breaking strength (cN) |
|---|---|---|
| Example 1 | 1034 | 16.4 |
| Example 2 | 235 | 17.2 |
| Comparative Example 1 | 1851 | 2.6 |
| Comparative Example 2 | 141 | 6.1 |

As shown in Table 2, Examples 1 and 2 show remarkably excellent breaking strength as compared with the Comparative Examples.

It is understood in conjunction with Test Example 1 that when the parameter M satisfies the range of the present invention, it is possible to prepare a yarn in an ideal state in which the carbon nanotubes are well aligned at a high density and have a good polarized Raman ratio and that when the yarn has this configuration, it will have very excellent breaking strength.

Although the present invention has been fully described by way of example, it is to be understood that the invention is intended to cover various modifications and equivalent arrangements included within the spirit and scope of the invention.

What is claimed is:

1. A process for preparing a yarn, which comprises:
   introducing a raw material that comprises a carbon source and a catalyst, into a reaction chamber having a heating means;
   converting the carbon source into a plurality of carbon nanotubes in a heating part of the reaction chamber with thermal energy supplied by the heating means; and
   growing the plurality of carbon nanotubes in the vertical direction to form a yarn by the interactions among the carbon nanotubes,
   wherein the following parameter M is controlled so as to be maintained at 150° C.·m·mg/sec to 1,800° C.·m·mg/sec,
   wherein the yarn has a polarized Raman ratio of 5 to 10, wherein the polarized Raman ratio is a ratio (IGII/IG⊥) of maximum intensity of G peaks in a longitudinal direction of the yarn and a vertical direction of the yarn in a range of 1,560 cm−1 to 1,600 cm−1 in a Raman spectrum analysis:

$$M=T \cdot L \cdot L \cdot F$$

in the above equation, T is the operating temperature (° C.) of the heating means, L is the length of the heating part (m), and F is the feed rate of the raw material (mg/sec).

2. The process for preparing a yarn of claim 1, wherein the parameter M is controlled so as to be maintained at 160° C.·m·mg/sec to 1,400° C.·m·mg/sec.

3. The process for preparing a yarn of claim 1, wherein the mass ratio of the catalyst to the carbon source is 0.01 to 0.2.

4. The process for preparing a yarn of claim 1, wherein the yarn has a breaking strength of 13 cN or more.

5. The process for preparing a yarn of claim 1, wherein the operating temperature of the heating means is 550° C. to 2,500° C.,
   the length of the heating part is 0.01 m to 10 m, and
   the feed rate of the raw material is 0.05 mg/sec to 10 mg/sec.

6. The process for preparing a yarn of claim 5, wherein the operating temperature of the heating means is 1,050° C. to 1,500° C.,
   the length of the heating part is 0.1 m to 2 m, and
   the feed rate of the raw material is 0.1 mg/sec to 3 mg/sec.

7. The process for preparing a yarn of claim 1, wherein the reaction chamber comprises:
   an inlet formed at the top thereof to introduce a raw material;
   a heating part extending downward from the inlet and provided with a heating means on the inner and/or outer side thereof, in which an operating temperature environment is made such that a carbon source is converted into a plurality of carbon nanotubes;
   a gathering part extending downward from the heating part, in which the plurality of carbon nanotubes is gathered to form a yarn by the π-π interaction; and
   an outlet extending downward from the gathering part and discharging the yarn in which the carbon nanotubes are gathered.

8. The process for preparing a yarn of claim 7, which further comprises applying a magnetic field to the inside and/or outside of at least one of the gathering part and the outlet in order for the lower ends of the plurality of carbon nanotubes that are being, and/or have been, converted to be vertically aligned.

9. The process for preparing a yarn of claim 1, wherein the carbon source comprises at least one selected from the group consisting of methanol, ethanol, isopropyl alcohol, butanol, pentanol, cetyl alcohol, ethylene glycol, propylene glycol, glycerol, erythritol, xylitol, sorbitol, bolemitol, ally alcohol, geraniol, propargyl alcohol, inositol, menthol, methane, hexane, ethylene, acetylene, methyl acetylene, and vinyl acetylene.

10. The process for preparing a yarn of claim 1, wherein the catalyst comprises at least one metallocene, and
   the metallocene is a compound of iron, nickel, cobalt, platinum, ruthenium, molybdenum, Or vanadium.

11. The process for preparing a yarn of claim 10, wherein the metallocene is ferrocene.

12. The process for preparing a yarn of claim 1, wherein the raw material further comprises 0.01 to 5 parts by weight of a catalyst activator per 100 parts by weight of the carbon source.

13. The process for preparing a yarn of claim 1, wherein a carrier gas is introduced into the reaction chamber together with the raw material in the step of introducing the raw material.

14. The process for preparing a yarn of claim 13, wherein the carrier gas comprises hydrogen gas and at least one of nitrogen gas and argon gas, and
   the hydrogen gas is contained in an amount of greater than 0% by volume up to 90% by volume based on the total volume of the carrier gas.

15. The process for preparing a yarn of claim 13, wherein the carrier gas is introduced at a feed rate of from 1 mg/sec to 200 mg/sec.

16. The process for preparing a yarn of claim 1, wherein the step of converting into carbon nanotubes is a step in which the carbon source is graphitized and/or carbonized on the catalyst for a carbon rearrangement, and the carbon nanotubes grow in the vertical direction on the catalyst.

17. The process for preparing a yarn of claim 1, wherein the step of obtaining a yarn comprises immersing the yarn discharged from the reaction chamber in a solvent and winding the immersed yarn using a cylindrical roller or a plate.

18. A yarn prepared by the process for preparing a yarn according to claim 1.

19. The process for preparing a yarn of claim 1, further comprising:
  forming at least a portion of the yarn outside of the heating part.

20. The process for preparing a yarn according to claim 1, further comprising:
  gathering the yarn outside of the heating part by a gathering part using π-π interactions among the carbon nanotubes, wherein the gathering part is positioned below the yarn and wherein the gathering part has a temperature that is lower than a temperature of the heating part.

* * * * *

UNITED STATES PATENT AND TRADEMARK OFFICE
CERTIFICATE OF CORRECTION

PATENT NO. : 11,408,097 B2
APPLICATION NO. : 16/572902
DATED : August 9, 2022
INVENTOR(S) : Se Hoon Gihm, Keun Soo Jeong and Yeon Su Jung It is certified that error appears in the above-identified patent and that said Letters Patent is hereby corrected as shown below:

In the Claims

Claim 1 Line 3 or Column 13 Line 35; Delete "," after "catalyst"

Claim 1 Line 18 or Column 13 Line 50; Replace "cm-1" with "cm$^{-1}$"

Claim 1 Line 20 or Column 13 Line 53; Replace "M=T•L•L•F" with "M=T•L•F"

Claim 10 Line 4 or Column 14 Line 41; Replace "Or" with "or"

Signed and Sealed this
Twenty-fourth Day of January, 2023

Katherine Kelly Vidal
*Director of the United States Patent and Trademark Office*